Dec. 31, 1957  E. S. MEAD  2,817,903
INSTRUMENT FOR DRAWING AND MEASURING ARCS
Filed Oct. 26, 1953
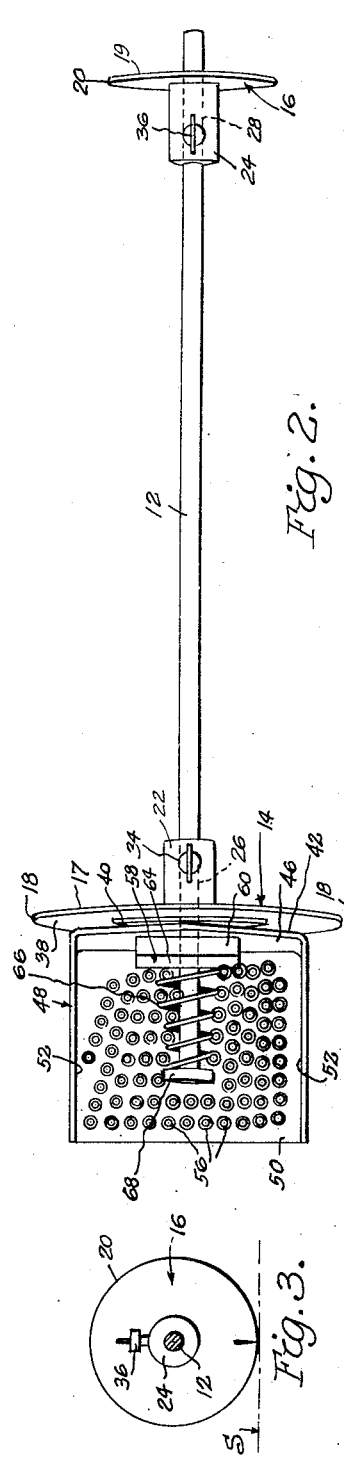
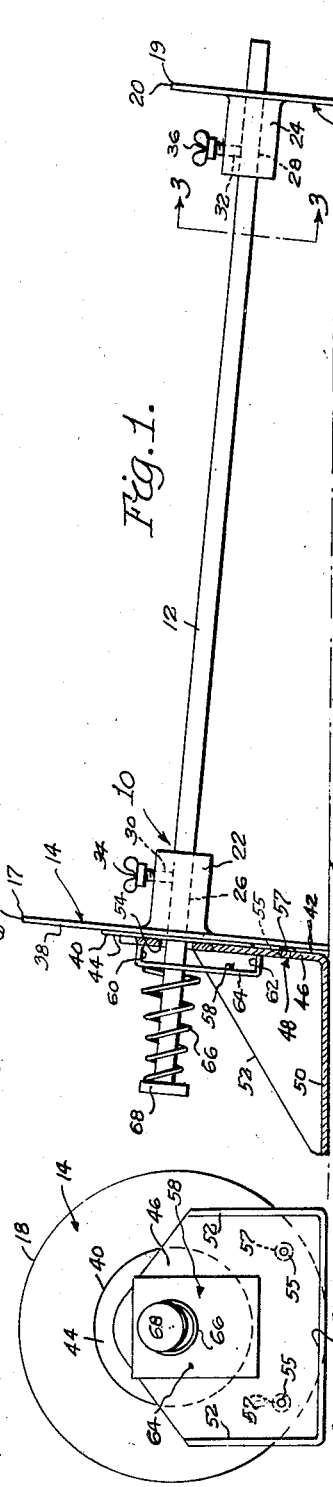
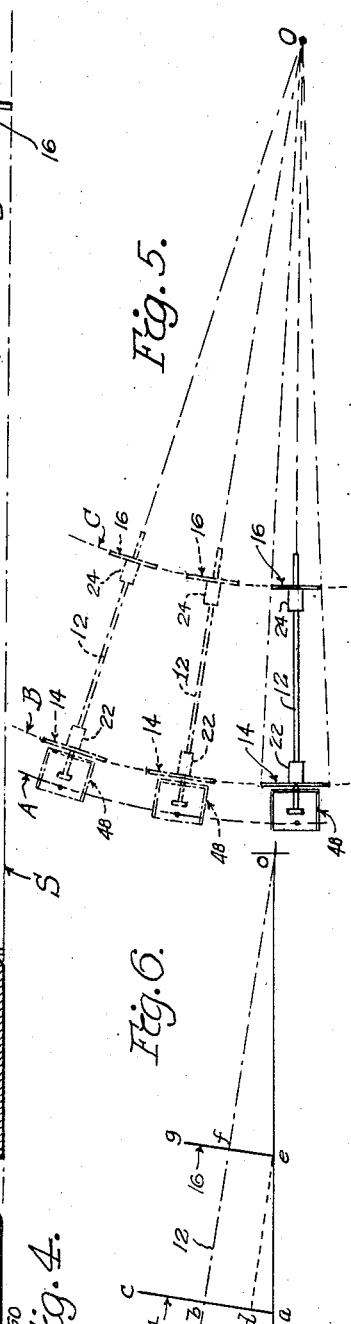
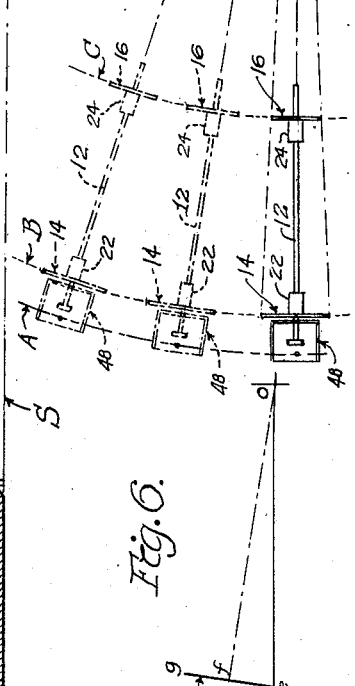
INVENTOR.
Earl S. Mead
BY Barthel + Bugbee
Attys United States Patent Office 2,817,903
Patented Dec. 31, 1957

2,817,903
INSTRUMENT FOR DRAWING AND MEASURING ARCS

Earl S. Mead, Detroit, Mich.

Application October 26, 1953, Serial No. 388,254

1 Claim. (Cl. 33—27)

This invention relates to drawing and measuring instruments and, in particular, to instruments for drawing and measuring circular arcs, especially those of long radii of curvature.

One object of this invention is to provide an instrument for drawing and measuring circular arcs, especially those of long radii of curvature, without the necessity of having access to the center of curvature of the arc or of providing any mechanical connection between such center and the pencil or other scriber.

Another object is to provide an instrument for drawing and measuring circular arcs which is rigid, compact and, when properly used, substantially free from error, so that even if the instrument is caused to retrace its original path, the mark by the scriber coincides with the mark made by the scriber on its previous stroke.

Another object is to provide an instrument of the foregoing character for drawing and measuring long radius arcs which is simple and rapid in operation and which is capable of drawing arcs of any radius regardless of the length of the radius.

Another object is to provide an instrument of the foregoing character for drawing and measuring long radius arcs which is quickly and easily adjustable to draw arcs of different radii over a wide range of such radii, the instrument being equipped with discs of different sizes to cover different ranges of radii.

Another object is to provide an instrument of the foregoing character for drawing and measuring long radius arcs which is substantially free from movable members which are likely to slip accidentally and cause error, or which are likely to sag or deflect, as in the case of compasses.

Another object is to provide an instrument of the foregoing character for drawing and measuring long radius arcs which for its principle of operation depends upon the action of two circular discs mounted upon a common axle and adapted to roll upon the surface on which the arc is to be drawn, the radius of the arc thus drawn or measured being determined primarily by the different diameters of the discs and the linear separation of their peripheries.

Another object is to provide an instrument of the foregoing character for drawing and measuring long radius arcs wherein the peripheries of the discs are knurled, roughened, made of frictional material or otherwise treated to increase their grip and prevent slippage relatively to that surface while rolling across it.

Other objects and advantages of the invention will become apparent during the course of the following description of the accompanying drawings, wherein:

Figure 1 is a side elevation partly in vertical section of an instrument for drawing or measuring long radius arcs, according to one form of the invention;

Figure 2 is a top plan view of the instrument shown in Figure 1;

Figure 3 is a substantially vertical section taken along the line 3—3 in Figure 1;

Figure 4 is a left-hand end elevation;

Figure 5 is a diagrammatic top plan view of reduced size, showing the path of travel of the instrument in drawing or measuring a circular arc of long radius; and Figure 6 is a geometrical view illustrating the mathematical principles involved in the construction and operation of the instrument.

Hitherto, the drawing and measuring of arcs of long radius has been a difficult problem, particularly where considerable accuracy was necessary and ordinary errors either of radius or of departures from true circular curvature could not be tolerated. Beam compasses provided for drawing circular arcs beyond the range of ordinary compasses are clumsy and unwieldy, and require beams as long as the radius of the arc to be drawn, as well as access to the center of the arc. Moreover, since beam compasses require a beam as long as the radius of the arc to be drawn or measured, the bending or other deflection of the beam becomes a serious source of error when the arc exceeds a certain practical range of radius, and extremely long radius arcs cannot be drawn because of the practical impossibility of providing a long enough beam. In addition to the unwieldiness of a long beam, its weight and the difficulty of storing it during periods of non-use become serious problems. The use of a wire, cord, tape or other flexible member in place of the beam provides ease of storage but leads to greater errors both of radius and true circularity than in the case of a beam compass.

The present invention provides a long radius arc drafting and measuring instrument which eliminates the foregoing disadvantages of previous instruments for that purpose, and provides a simple and compact instrument which is substantially free from the errors to which prior instruments were subject. In general, the instrument consists of a relatively rigid rod upon which are mounted two spaced rigid circular discs of known diameters and placed with their peripheries at a known separation. The discs are of different diameters, depending upon the radius of the arc to be drawn or measured, and a holder for a pencil or other scriber is mounted adjacent the larger disc. Various small apertures are provided for the reception of the point of a pencil or other scriber, so that the radius and consequently the position of the arc may be varied slightly for a single setting of the instrument.

Referring to the drawing in detail, Figures 1 to 4 inclusive show a long radius arc drawing and measuring instrument, generally designated 10, according to one form of the invention, as consisting of a substantially rigid rod 12 of circular or other cross-section upon which a large disc 14 and a small disc 16 are slidably mounted to vary the separation between the surface-contacting rearward edges 17 and 19 of their peripheries 18 and 20 respectively. The discs 14 and 16 are of relatively rigid material, such as metal, so as not to deform during drawing or measuring operations, and their peripheries 18 and 20 are preferably slightly knurled or roughened or made of frictional material, such as rubber or coated with frictional gripping particles, such as abrasive particles, in order to increase the frictional grip of the discs 14 and 16 upon the surface S on which the arc A is to be drawn or measured (Figure 5). While the arc A is being drawn, as will subsequently appear, the discs 14 and 16 roll along arcs B and C of shorter radii, all of the arcs having their centers at the point O. The surface S is assumed to be a flat surface.

The discs 14 and 16 have hubs 22 and 24 with longitudinal bores 26 and 28 adapted to slidably receive the rod 12 and also have transverse threaded bores 30 and 32 for receiving locking screws 34 and 36 respectively. The forward or outer face 38 of the larger disc 18 is preferably provided with a bearing disc 40 of suitable material, such as brass, secured stationarily thereto. Slidably mounted upon the forward end of the rod 12, and having its rearward face 42 engageable with the forward face 44 of the bearing disc 40 is the approximately vertical upper wall 46 of a scriber holder, generally designated 48, the horizontal lower wall 50 of which rests upon the surface S on which the arc A is to be drawn or measured, and it is joined to the upper wall 46 by spaced parallel approximately triangular webs 52 rising from the opposite side edges of the lower wall 50. The upper wall 46 of the scriber holder 48 is provided with an enlarged hole 54 through which the rod 12 loosely passes. Multiple scriber point holes 56 are preferably formed in the lower wall 50 for the insertion of the point of a pencil or other scriber, the holes 46 being arranged in rows in such a manner that each hole is a slightly different and known distance from the front surface 38 of the disc 14, so as to enable arcs of slightly different radii to be drawn with but a single setting of the disc 14 and 16 upon the rod 12.

In order to decrease the friction between the upper wall 46 and the bearing disc 40, the upper wall 46 is drilled as at 55 at laterally-spaced locations (Figure 4) to receive tiny round-headed rivets-like members 57, the rounded heads of which engage the bearing disc 40 in almost point-like areas of contact. Yieldingly engaging the upper wall 46 of the scriber carrier 48 is a channel-shaped contact member 58 having upper and lower flanges 60 and 62 respectively, the edges of which are engageable with the upper and lower portions of the upper wall 46 on opposite sides of the rod 12. The central portion or web 64 of the contact member 58 is engaged by the rearward end of a compression spring 66, the forward end of which engages an abutment or enlargement 68 on the forward end of the rod 12.

*Derivation of formulae for use of instrument*

Referring to Figure 6, the mathematical formulae for the use of the instrument either for scribing or measuring a circular arc are easily derived. The given quantities are $ab = r_1$ the radius of the larger disc 14
$ef = r_2$ the radius of the smaller disc 16
$ae = s$ the separation of the peripheries of the discs The unknown quantity $ao$ is R, the radius of the arc to be measured, drawn from the center $o$. If the arc is to be scribed, however, R is known, and $s$ becomes the unknown quantity.

Since the triangles $oba$ and $ofe$ are similar right triangles, the usual proportion holds:

$$\frac{ao}{eo} = \frac{ab}{ef}$$

and from the geometry of the figure, by inspection $$eo = ao - ae$$

whence, substituting in the above formula $$\frac{ao}{ao - ae} = \frac{ab}{ef}$$

in which, by substituting the symbols assigned above to these distances $$\frac{R}{R - s} = \frac{r_1}{r_2}$$

Multiplying out to clear the denominators gives us $$Rr_2 = Rr_1 - sr_1$$

whence by transferring terms to opposite sides of the equation gives us $$R(r_1 - r_2) = sr_1$$

(Graphically it will be seen from Figure 6 that $r_1 - r_2 = ad$ since $ef = db$)

whereupon we obtain the following working formulae:

$$R = s \frac{r_1}{r_1 - r_2} \qquad (I)$$

and $$s = R \frac{r_1 - r_2}{r_1} \qquad (II)$$

*Operation*

Let it be assumed that it is desired to draw or scribe an arc of a given radius with the instrument 10, and that for this purpose a scriber hole 56 is selected whose distance from the surface contacting edge 17 of the disc 14 is known in advance from the constructional constants of the instrument. This known distance of the scriber hole 56 from the contact edge is subtracted from the radius desired for the arc to obtain the radius R to apply to Formula II above. Solution of this formula, using the known values of the radii of the discs 14 and 16, gives the separation $s$ to which the contacting edges 17 and 19 must be set in order to draw or scribe the desired radius. The instrument is set by loosening one of the set screws 34 or 36 and moving its corresponding disc 14 or 16 along the rod 12 toward or away from the other disc until their contacting edges 17 and 19 are separated by the distance found by Formula II, whereupon the set screw 34 or 36, as the case may be, is tightened.

The user than lays the instrument on the drawing paper or other surface on which the arc is to be drawn, places the point of the pencil or other scriber in the selected hole 56, and, while pressing lightly with the fingers of one hand upon the rod 12, rolls the instrument on its discs 14 and 16 across the surface S (Figure 5), causing them to trace out arcuate paths B and C, and at the same time causing the pencil or other scriber to trace out the arc A. If the arc A is of a sufficiently short radius that it can be checked by a beam compass or other means, it will be found to be exactly of the radius desired, as obtained by the use of Formula II.

If, on the other hand, the user wishes to measure the radius of curvature of a circular arc of unknown curvature, he rolls the instrument across the surface S so that the contacting edge 17 of the periphery 18 of the larger disc 14 runs along the arc to be measured. If it does not follow the arc, and shifting of the small disc 16 off the surface S does not align the path of travel of the peripheral edge 17 with the unknown arc, he moves the small disc 16 back and forth and by a cut-and-try procedure readjusts the separation of the two contacting edges 17 and 19 until the contacting edge 17 travels approximately along the unknown arc and roughly coincides with it.

He then inserts a scriber in one after another of the scriber holes 56 until a hole is found in which the scriber accurately follows the unknown arc. The separation $s$ of the contacting edges 17 and 19 is then substituted in the above Formula I to obtain the radius R of the arc B traced out by the contacting edge 17 of the disc 14. The value of R thus obtained, being the radius to the arc B traced by the contacting edge 17, must be increased by the distance between the contacting edge 17 and the selected scriber hole 56, in order to find the true radius of the unkown arc A which the scriber followed. This distance is a constant of the instrument and from Figure 5 is of course seen to be the distance between the unkown arc A traced out by the scriber and the arc B traced out by the contacting edge 17 of the larger disc 14.

It will be obvious from the foregoing discussion that a single pair of discs 14 and 16 and a single rod 12 may not cover a sufficiently large range of radii. Accordingly, in practice, the instrument 10 is supplied with a set of discs 14 and 16 of different diameters and a set of rods 12 of different lengths.

It will be further evident from a consideration of Figure 6 that a curve of desired radius may be scribed upon a piece of drawing paper without using the scriber holder 48 and scriber by using the indentation formed in the surface of the drawing paper by the contacting edge 17 of the disc 14 directly as the arc to be drawn, and thereafter going over the indentation with a pencil or pen to make it permanent, with or without the use of French curves or other aids in drawing arcs. It will also be evident that the radius of an unknown arc may be similarly determined without the use of the scriber holder 48 and scriber by adjusting the separation of the contacting edges 17 and 19 of the discs 14 and 16 relatively to each other until the contacting edge 17 of the larger disc 14 accurately follows the curvature of the unknown arc and coincides with it. The separation of the contacting edges 17 and 19 is then measured and substituted in the above Formula I to find the true radius of the unknown arc. It will also be evident that the smaller disc 16 also traces out a circular arc, hence may also be used to scribe or measure an arc in a manner analogous to the foregoing manner.

In principle, from the foregoing remarks, the geometrical action is that of the rolling of the frustum of a cone along a flat surface, with the elements of the cone converging toward the apex at the point O, the length of an element being the radius desired or existing for the arc traced out by the base of the cone. Different arcs of different radii result from cones of different height resulting from moving the two discs toward or away from one another along the rod so as to increase or decrease the height of the frustum of the cone and accordingly increasing or decreasing the length of the elements thereof which corresponds to the radius of the arc. From the foregoing theory, it will also be evident that if the discs 14 and 16 are of the same diameters, they will constitute a geometrical cylinder with the elements parallel to one another instead of intersecting at the apex of a cone. Consequently, circles of equal diameter will trace out arcs of infinite radii, which are, of course, straight parallel lines.

What I claim is:

An instrument for scribing and measuring circular arcs upon a flat surface, said instrument comprising an elongated supporting member, a pair of rollable members with circular peripheries of different radii of curvature, said rollable members being stationarily mounted in axially-spaced relationship upon said supporting member, one of said rollable members being mounted for adjustment along said supporting member relatively to the other rollable member whereby to vary the axial separation of said rollable members, a scriber holder having an upstanding portion rotatably mounted upon said supporting member in a plane parallel to one of the rollable members and having a substantially horizontal plate-shaped scriber-point-guiding portion disposed adjacent and parallel to said surface and adapted to position the point of the scriber against said surface, said scriber-point-guiding portion having a multiplicity of scriber-point-guiding holes therethrough disposed at different predetermined distances from the periphery of one of said rollable members, and resilient means engaging and urging said upstanding portion of said scriber holder against one of said rollable members.

References Cited in the file of this patent

UNITED STATES PATENTS

| | | |
|---|---|---|
| 211,825 | Worthington | Jan. 28, 1879 |
| 390,360 | Gieseler | Oct. 2, 1888 |
| 805,216 | Lynch | Nov. 21, 1905 |
| 2,542,537 | Klemm | Feb. 20, 1951 |

FOREIGN PATENTS

| | | |
|---|---|---|
| 29,337 | Great Britain | 1897 |
| 607,418 | Great Britain | Aug. 31, 1948 |